United States Patent [19]

Plesh, Sr.

[11] Patent Number: 5,301,785
[45] Date of Patent: * Apr. 12, 1994

[54] METHOD FOR COOLING PLATES AND INSERT THEREFOR

[76] Inventor: Ronald L. Plesh, Sr., 31 Hemlock Hill, Orchard Park, N.Y. 14127

[*] Notice: The portion of the term of this patent subsequent to Nov. 30, 2010 has been disclaimed.

[21] Appl. No.: 34,911

[22] Filed: Apr. 1, 1993

Related U.S. Application Data

[63] Continuation-in-part of Ser. No. 867,040, Apr. 10, 1992, Pat. No. 5,265,711.

[51] Int. Cl.⁵ ............................................. B65G 13/00
[52] U.S. Cl. .................................................. 193/35 R
[58] Field of Search ............ 198/615, 721; 193/35 R, 193/37; 72/251

[56] References Cited

U.S. PATENT DOCUMENTS

| 1,676,011 | 7/1928 | Evans | 198/721 |
|---|---|---|---|
| 2,172,379 | 9/1939 | Harris | 193/35 |
| 3,509,978 | 5/1970 | Bedford | 193/35 |
| 4,044,585 | 8/1977 | Buchheit | 72/201 |
| 4,554,813 | 11/1985 | Feldmann et al. | 72/251 |
| 4,945,746 | 8/1990 | Jakimowicz et al. | 72/251 |
| 5,076,412 | 12/1991 | Huber | 193/37 |
| 5,090,547 | 2/1992 | Schafer | 193/35 R |

*Primary Examiner*—Joseph E. Valenza
*Attorney, Agent, or Firm*—Hodgson, Russ, Andrews, Woods & Goodyear

[57] ABSTRACT

A method for cooling hot metal plates formed in a plate mill and inserts therefor. The metal plates are slid over a cooling bed plate transfer grid having a plurality of inserts supporting rollers wherein the metal plates are in contact with the rollers for decreased friction and reduced marring of the metal plates. The insert is clamped to the transfer grid so that it is easily and quickly removable and replaceable for cost effective plate cooling.

20 Claims, 5 Drawing Sheets

METHOD FOR COOLING PLATES AND INSERT THEREFOR

This application is a continuation-in-part of co-pending U.S. patent application Ser. No. 07/867,040, filed Apr. 10, 1992, now U.S. Pat. No. 5,265,711 the disclosure of which is incorporated herein by reference.

The present invention relates generally to transfer grids for ferrous and non-ferrous metal plates and the like and to methods using transfer grids for cooling plates.

When initially formed in a plate mill, metal plates are very hot and must be suitably cooled before further processing. The plates may typically be up to 210 inches wide, and/or 150 feet long, and/or 10 inches thick. They can be as much as about 28 inches thick. A cooling bed is typically provided over which the plates are slid by the use of chains (pusher dogs). The bed is constructed to allow plentiful air circulation to the plates for cooling thereof as they traverse the length of the cooling bed over a period of perhaps 2 or 3 hours.

In a typical installation, the cooling bed may have a length of perhaps 150 feet or more and a width of perhaps 150 feet or more to accommodate the very large plates.

Patents which are of interest in showing the use of rollers for effecting entry of plates onto a cooling bed are U.S. Pat. Nos. 4,044,585 to Buchheit and 4,554,813 to Feldmann et al.

A cooling bed is typically composed of a plurality of transfer grids each being cast as a single piece. Each grid may typically be about 12 feet long and 8 feet wide. A transfer grid typically comprises a plurality of parallel portions or members extending in the direction of travel, and the metal plates are transferred by movement manually along the length thereof while engaging the upper surfaces thereof. These plate engaging members are joined by integral cross-portions or cross-members which extend across the grid width at right angles thereto, the plate engaging members projecting above the cross-members.

The movement of the metal plates over the grid surfaces undesirably causes wear thereof requiring relatively frequent replacement of the grids, and such replacement is costly. In addition, the under surfaces of the plates may be marred as they are conveyed along the grid members.

U.S. Pat. No. 1,676,011 to Evans discloses a glass cutting table having roller units which project through recesses and which are mounted by means of levers bolted to shift bars beneath the table. Each unit is further supported upon a pivot pin which extends transversely between and is bolted to a pair of channels on opposite sides of the respective unit. Such glass cutting tables are not suitable for use as cooling beds over which hot and heavy metal plates are slid, and it is considered desirable that roller units in cooling beds be more easily and quickly replaceable.

U.S. Pat. No. 3,509,978 to Bedford discloses conveyor equipment having a support surface with rectangular apertures therein in which roller elements are inserted. A roller element is held in position by a support member having a pair of triangular extensions on opposite sides of the aperture. Each triangular extension has an aperture with a lead-in slot for receiving axles of the rollers. The support member of Bedford has a pair of grooves on opposite sides for receiving the respective edges of the support surface. This arrangement undesirably requires the support members to be formed of a resilient material, such as a plastic material, so that the opposite limbs can be flexed inwardly for clipping to the opposed edges of the support structure. Such an arrangement would not be suitable for a cooling bed over which hot and heavy metal plates are slid.

Other patents showing roller rails or the like are U.S. Pat. Nos. 2,172,379 to Harris and 5,090,547 to Schafer.

Runout tables have been provided which are constructed to have side-by-side rollers over which the metal plates travel during cooling. These rollers are supported at their ends and extend generally over the entire width of the runout table. See, for example, U.S. Pat. No. 4,945,746 to Jakimowicz et al. Other cooling beds have been provided which have side-by-side bars which lift and move forward perhaps 2 feet for movement of a plate then retract down and back to the starting point to again move the plate forward. Both of these types of cooling beds are very expensive to build. However, these cooling beds do not have the wear problems associated with the cast transfer grids, and the plates are generally not marred. Many customers are now demanding that the product not be marred. To maintain customer satisfaction so as to remain competitive, it is necessary to provide the capital outlay for an expensive replacement cooling bed or to modify an existing cooling bed with the transfer grids so that marring of the plates is suitably reduced.

It is accordingly an object of the present invention to retrofit existing transfer grids so as to reduce marring of metal plates which are transferred thereby as well as to reduce transfer grid wear.

It is another object of the present invention to provide such retrofitting inexpensively yet ruggedly.

It is a further object of the present invention to provide such a retrofit which can be maintained inexpensively.

It is yet another object of the present invention to provide low maintenance long lasting transfer grids inexpensively which can transfer plates with reduced marring.

It is still another object of the present invention to cool hot metal plates formed in a plate mill at overall reduced cost.

In order to reduce marring of the metal plates as well as reduce grid wear, in accordance with the present invention inserts having rollers which project above the grid surfaces are provided in pockets defined by adjacent plate engaging members and cross-members, for reducing or eliminating frictional sliding contact with the plate engaging members. In order to achieve overall reduced cost of the plate cooling process, the inserts are clamped to the cooling bed plate transfer grid for quick and easy removal and replacement.

The above and other objects, features, and advantages of the present invention will be apparent in the following detailed description of the preferred embodiments thereof when read in conjunction with the accompanying drawings wherein like reference numerals denote the same or similar parts throughout the several views.

DETAILED DESCRIPTION OF THE PREFERRED EMBODIMENTS

Figure 1:
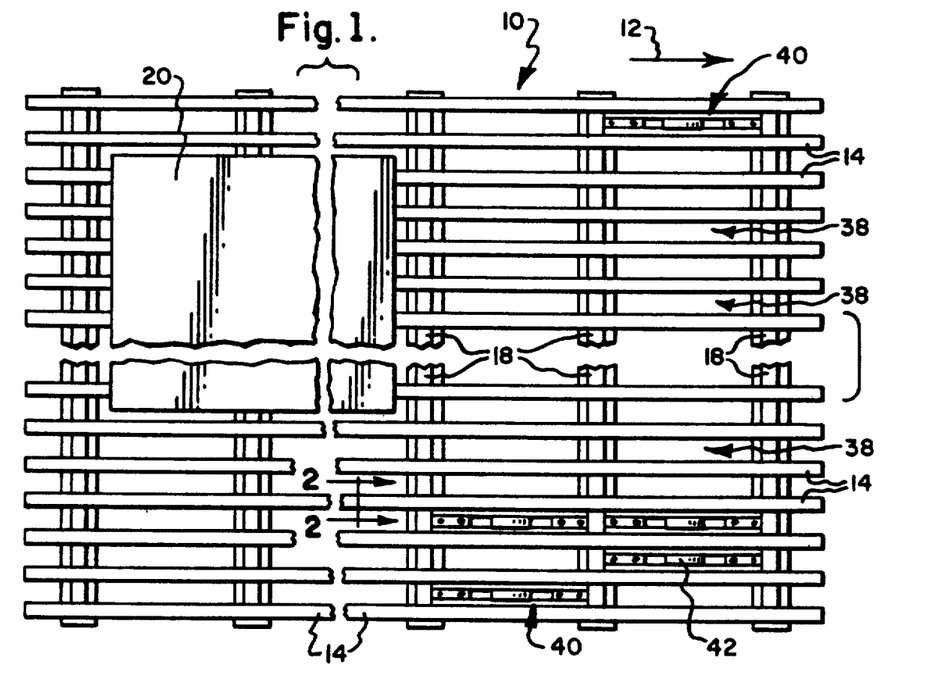
FIG. 1 is a plan view of a cooling bed transfer grid, including some roller inserts, which embodies the present invention.
Figure 2:
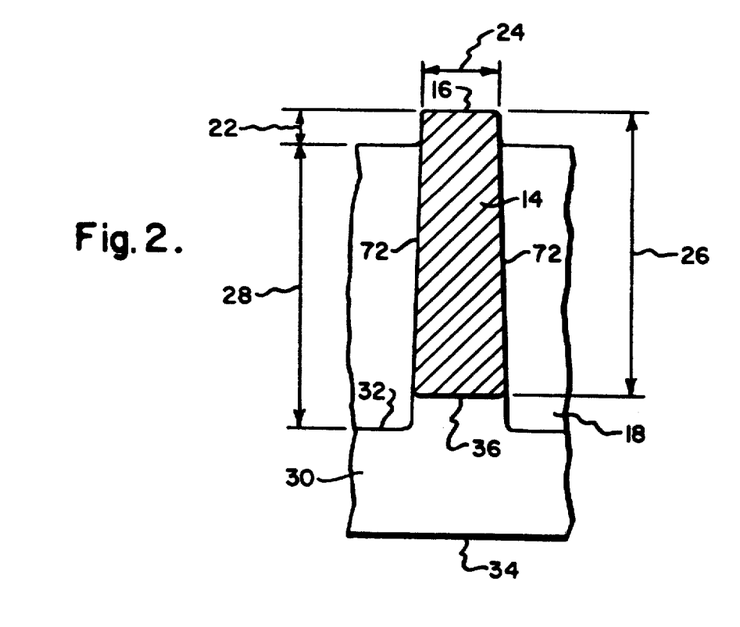
FIG. 2 is an enlarged vertical sectional view of a portion of the transfer grid of FIG. 1, taken along lines 2—2 thereof.
Figure 4:
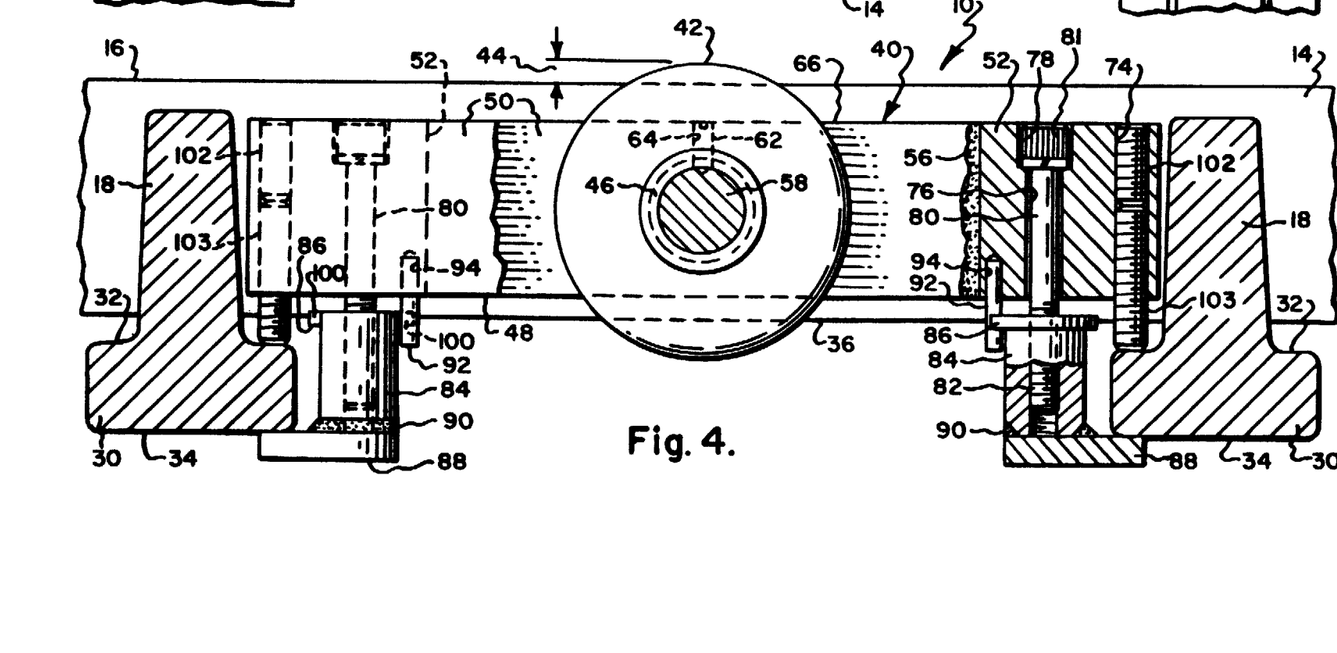
FIG. 4 is a side elevation view, partly in section, of the insert of FIG. 3.

Referring to FIGS. 1 and 2, there is illustrated generally at 10 a grid which with a plurality of like grids forms a cooling bed for transferring hot ferrous and non-ferrous metal plates, illustrated at 20, in the direction of travel illustrated at 12 and for cooling them by air circulation and the passage of time as they are moved therealong such as by chains or the like. The transfer grid 10 is cast or fabricated as a weldment or otherwise suitably constructed in a single piece of iron or other suitable material and includes a plurality of first parallel portions or members 14 extending in the direction of travel 12 and providing upper surfaces 16 which, without the inserts described hereinafter, frictionally engage the metal plates 20 for sliding movement of the metal plates therealong. The members 14 are supportedly joined by cross-portions or cross-members 18 which extend at right angles thereto. The members 14 project above the cross-members 18 a distance illustrated at 22 of perhaps about ⅛ inch to provide the supporting surfaces 16 receiving the plates 20 and along which the plates are conveyed from left to right, as seen in FIG. 1, in the direction illustrated at 12. This distance could be reduced by wear to zero. The grid 10 may have a length of perhaps about 12 feet and a width of perhaps about 8 feet. Members 14 may have a upper surface width, illustrated at 24, of perhaps about 1¼ inch and have a height, illustrated at 26, of perhaps about 4 inches. The height, illustrated at 28, of the cross-members 18 may also be perhaps 4 inches. As best seen in FIG. 4, the lower portions of the cross-members 18 are sometimes flanged to provide lower flanges 30 having upper and lower surfaces 32 and 34 respectively, the upper surface 32 being below the lower surface 36 of the members 14. Members 14 and 18 are slightly tapered, as illustrated at 72, so as to have a greater thickness at the bottom surfaces thereof. The space bounded by a pair of members 14 and a pair of cross-members 18, which is generally rectangular, defines a pocket, illustrated at 38. The transfer grid 10 as so far described is of a type which is conventional in the art and will therefore not be described in any greater detail herein.

The frictional sliding movement of the metal plates 20 over the surfaces 16 of the members 14 causes wear thereof with the result that frequent replacement of the entire transfer grid is typically required at high cost. In addition, the under surface of the plates 20 may undesirably be marred as they are conveyed along the grid members 14. In order to reduce such wear and marring, in accordance with the present invention a plurality of inserts, illustrated generally at 40, providing rollers 42, are mounted in the pockets 38 as hereinafter described. The inserts 40 are fitted within the pockets 38 so that the rollers 42 project above the upper grid surfaces 16 a distance, illustrated at 44, which, along with other inserts 40 similarly positioned in other pockets, will support the plates 20 above the grid surfaces 16 as the plates move along the cooling bed to thus eliminate or reduce the sliding friction of the plates against the surfaces 16. This distance 44 is preferably between about 0.12 and 0.62 inch. For example, this distance 44 is perhaps about 0.25 inch. While it may not be necessary to provide an insert 40 in every single pocket 38, enough inserts 40 are preferably provided so that the plates 20 are suitably received on the rollers 42 to avoid frictional contact with the surfaces 16, it being understood that FIG. 1 only shows a few representative inserts. The required density of the rollers 42 will be related generally to the sizes of the plates 20 to be transferred on the grid, and can be determined using principles commonly known to those of ordinary skill in the art to which this invention pertains. A greater number of inserts provides greater support and longer bearing life.

Figure 3:
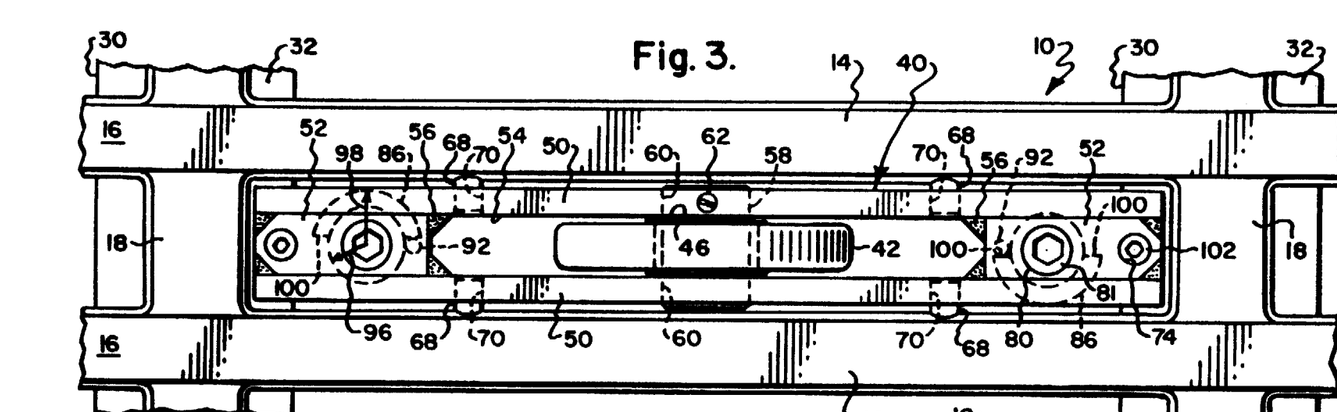
FIG. 3 is an enlarged plan view of one of the inserts of FIG. 1 mounted in a transfer grid similar to that of FIG. 1.

Referring to FIGS. 3 and 4, the insert length and width are selected to be slightly less than the corresponding pocket dimensions to be able to accommodate slight variances in pocket dimensions. In other words, the insert length and width are selected for the smallest expected opening size. The thickness or height of the body of the insert 40 is such that the lower surface 48 thereof is above the upper flange surface 32. For example, the body of insert 40 may have a length of perhaps about 15 inches, a width of perhaps about 2 inches, and a height of perhaps about 3 inches.

As seen in FIG. 3, the body of the insert 40 comprises a pair of parallel plate members 50 with a pair of members 52 sandwiched between and welded to the members 50 at the end portions thereof respectively as by welds 56. Alternatively, the insert body may be cast as a single piece or the members 50 and 52 bolted or screwed together, or the insert body may otherwise be suitably constructed. The combined thickness of plates 50 and a member 52 constitutes the width of the body of the insert 40. The members 52 are spaced from each other so as to leave a generally elongate central opening 54 between the members 52 and between the plate 50. The roller 42 is rotatably mounted by means of bushing 46 on an axle 58 which extends across the opening 54 and is mounted in apertures 60 in the plates 50 and secured thereto by means of a setscrew or cylindrical pin 62 threadedly received in a vertical threaded or cylindrical aperture 64 extending downwardly from the upper surface 66 of the body of the insert 40, i.e., the upper surface of a plate 50. Alternatively, bushing may be provided in the apertures 60 for rotation of the axle 58 with the roller 42 rigidly mounted thereon. More expensive heat resistant bushings may be required for cooling bed locations where the plates will be hotter, and less expensive bushings may be used in cooling bed locations where the plates will be cooler. Suitable bushings can be selected using principles commonly known to one of the ordinary skill in the art to which this invention pertains. The plates 50 may be spaced, for example, a distance of perhaps about 1.2 inches to accommodate a roller 42 having a width of perhaps about 1.1 inch. The roller diameter may perhaps be between about 5 and 8 inches.

The insert 40 may be stabilized laterally by means of perhaps 4 setscrews 68 with two of the setscrews threadedly received in threaded apertures 70 which extend through the thickness of each of the plates 50 at opposite ends of opening 54, and the setscrews 68 are caused to protrude from the apertures 70 to engage the respective sides of the grid members 14 for mounting of the insert 40 in the pocket 38.

Each of the members 52 is provided with means for clampingly engaging the respective cross-member flange 30 so as to secure each end of the insert 40. Only one of the members 52 is described herein, it being understood that the other is identical thereto. A vertical threaded aperture 74 is provided vertically through the height of the member 52 for alignment with the upper surface 32 of the flange 30 when the insert 40 is mounted in the pocket 38. Inwardly (toward the opening 54) from the aperture 74 is provided an unthreaded vertical bore 76 which also extends through the height of the member 52 and in which is provided a counterbore 78 in the upper surface thereof.

A rotatable cylindrical elongate member 80 is received within the bore 76 and extends downwardly beyond the bore 76 and includes a head member 81 which is contained within the counterbore 78 and is manipulated by a wrench for rotating the member 80. The lower end portion 82 of member 80 (the portion extending downwardly beyond the lower surface 48 of the body of the insert 40) threadedly and coaxially engages cylindrical member 84 to which are rigidly attached at its upper end member 86 and to its lower end bracket 88. Bracket 88 is welded thereto as by welds 90 and comprises an elongate member one end of which is flush with the cylindrical surface of member 84 and the other end of which extends radially outwardly beyond member 84 a distance sufficient to engage the under surface 34 of the flange 30, as shown in FIG. 4. Alternatively, members 84, 86, and 88 may be cast as a single piece.

A pin 92 is securely received in an aperture 94 in the lower surface 48 of the member 52 at a position inwardly from bore 76 (towards the roller 42) and extends downwardly beyond the surface 48 and beyond the member 86. As shown in FIG. 3, member 86 has a first radius, illustrated at 96, over an arc of 180 degrees, this radius being insufficient in relation to the pin 92 to engage the pin 92. Member 86 has a second radius, illustrated at 98, over the remaining 180 degrees of arc which is greater than the radius 96 and which provides a shoulder 100 on diametrically opposite sides of the member 86 for engaging the pin 92. The pin 92 is thus positioned to be engaged by each of the shoulders 100 and thus acts as a stop to prevent rotation of members 84, 86, and 88 through more than about 180 degrees. Movement of member 86 through an arc of 180 degrees to a point where it is stopped by engagement of a shoulder 100 with the pin 92 also effects movement of bracket 88 through 180 degrees from one position, shown in FIG. 4, wherein the bracket 88 is positioned below the flange surface 34 to engage the flange to another point wherein the bracket 88 is rotated away from the flange for disengagement therewith. When the rotation of the member 86 as well as members 84 and 88 is stopped by engagement of the pin 92 by a shoulder 100, the rotatable member 80 may still be screwed into or out of member 84 whereby the distance between member 88 and the lower surface 48 of the insert may be adjusted for variances in flange size or other grid size variances.

Setscrews 103, threadedly contained in aperture 74, are used to adjust the distance 44, i.e., the height position between surfaces 16 and the engaging surface of roller 42. Members 84, 86, and 88 are then activated with member 88 engaging the flange lower surface 34 to pull setscrew 103 into tight contact with flange top surface 32 for tightly securing the insert in position. Simultaneously, the setscrews 68 are adjusted for lateral stability of the insert 40. Jam setscrew 102, also threadedly contained in aperture 74, is used to lock setscrew 103 in place. Setscrew 102 should of course be sized so as not to protrude from aperture 74 when the insert is installed.

Figure 5:
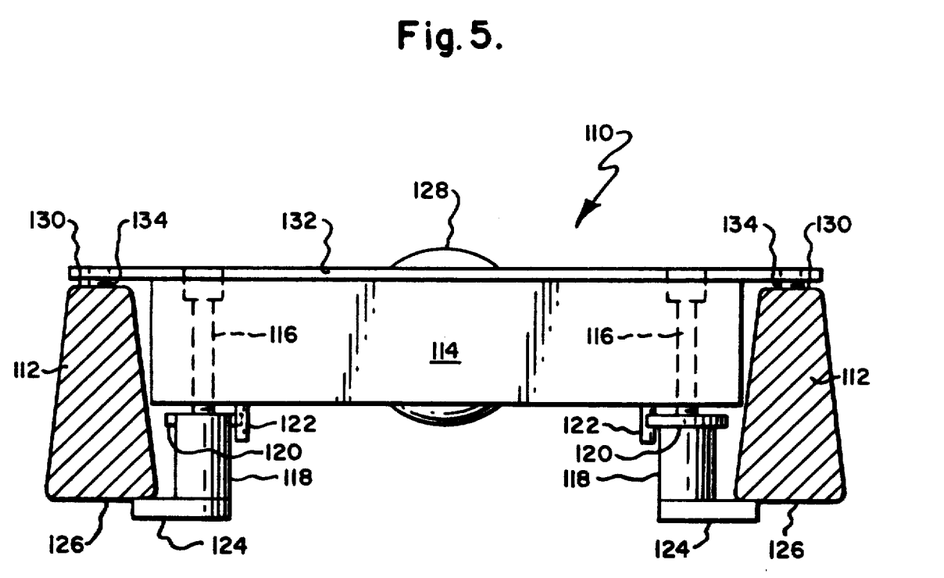
FIG. 5 is a side elevation view of an insert in accordance with an alternative embodiment of the present invention.

As previously discussed, some grids may not have flanged cross-members. Referring to FIG. 5, there is illustrated at 110 an alternative embodiment of the insert for use with grids having members (not shown) similar to members 14 and having unflanged cross-members 112. The insert 110 includes a body portion 114, rotary members 116, cylindrical members 118, stop members 120, pins 122, members 124 for engaging the lower surfaces 126 of cross-members 112, and rollers 128 similar to the body of insert 40, rotary members 80, cylindrical members 84, stop members 86, pins 92, members 88, and rollers 42 respectively of inserts 40 and including setscrews (not shown) similar to setscrews 68 for inserts 40. In order to clamp the insert 110 between the lower and upper surfaces 126 and 130 respectively of cross-members 112, a plate member 132 is welded or bolted or otherwise suitably attached to the upper surface of the body portion 114 to extend over the length thereof and beyond the ends thereof and sized to overlie the cross-members 112. Setscrews 134 contained in threaded apertures through the thickness of the plate member 132 are provided in locations to be in alignment with surfaces 130 to provide clamping engagement of the cross-members 112 between setscrews 134 and members 124 similarly as provided by setscrews 103 and members 88 for the inserts 40. A jam screw (not depicted) similar to jam screw 102 may also be provided, and the insert 110 may otherwise be similar to the insert 40.

The inserts 40 may be quickly, easily, and inexpensively retrofitted to existing grids to reduce wear thereof whereby the grids need not be replaced at great expense as often as well as to prevent marring of the metal plates 20 for a higher quality product. This may be achieved, with respect to the embodiment of FIGS. 1 to 4, by merely positioning the inserts 40 in the pockets 38, screwing the setscrews 103 downwardly to engage the upper flange surfaces 32 and achieve the desired distance 44, then engaging the flange lower surfaces 34 with the brackets 88 and manipulating rotatable members 80 to clampingly engage the flanges 30 while simultaneously adjusting the lateral positioning of the insert 40 by means of setscrews 68. Once the insert position both vertically and laterally is suitably achieved, then the setscrews 68 may be tightened and jam setscrews 102 applied to lock the positions of setscrews 103. The insert is then ready for use with the plates 20 engaging the surfaces of the rollers 42 to reduce or eliminate sliding friction between the plates 20 and the upper grid member surfaces 16 so that the grid 10 may be longer lasting while also preventing marring of the plates 20 for a higher quality product. Retrofitting of inserts 110 may be similarly achieved. The retrofitted grid 10 may be inexpensively maintained by merely removing and replacing inserts as needed without the requirement of replacing an entire grid. The inserts may also allow increased chain life and lower power consumption due to decreased friction and an increased plate cooling rate due to decreased contact with hot grates, the tendency of the grates as a result to stay cooler, and increased air circulation. The ease and inexpense with which the inserts may be installed and replaced may also allow a new grid with such inserts to be competitive with existing cooling bed arrangements.

Figures 6, 7:
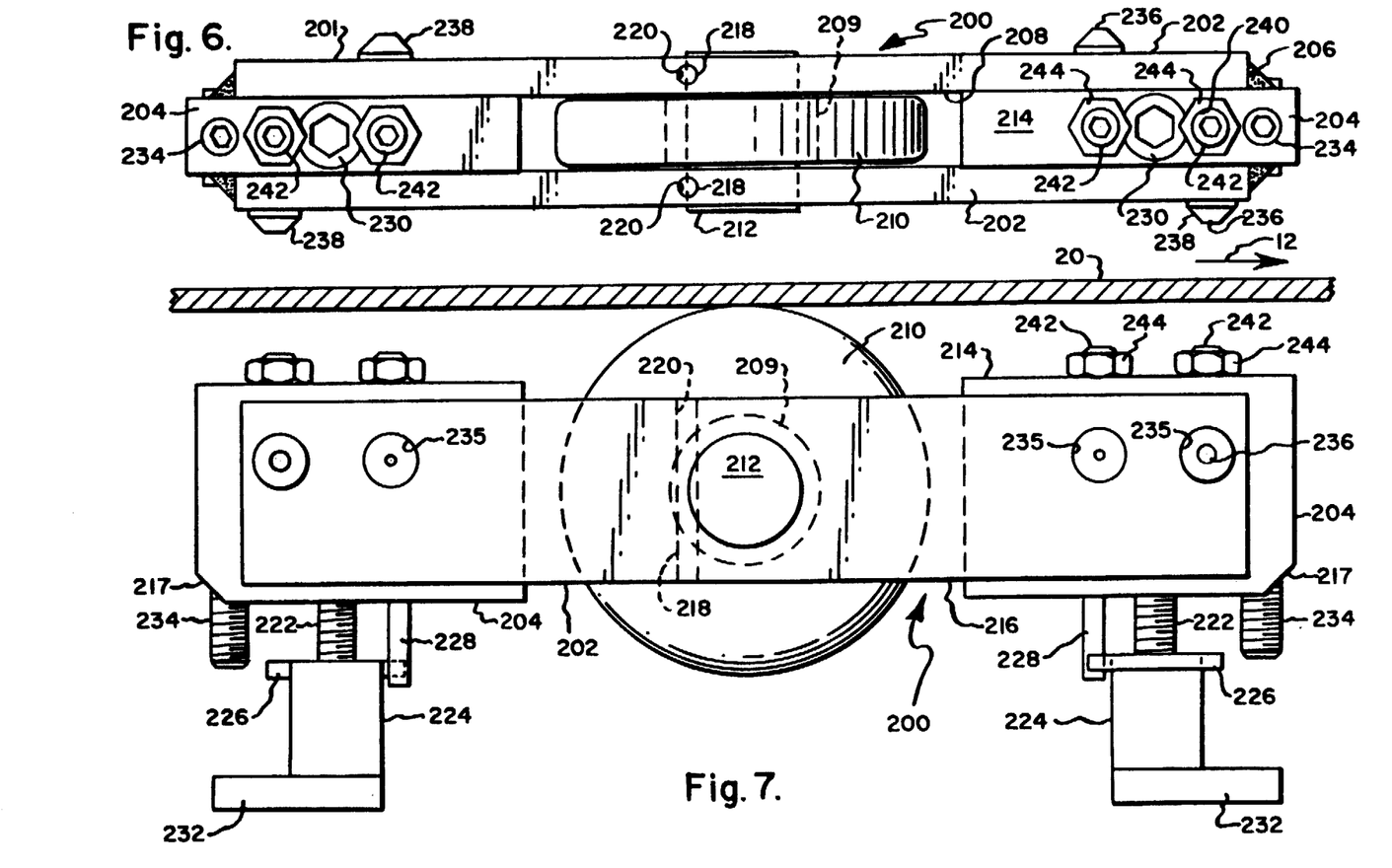
FIG. 6 is a view similar to that of FIG. 3 of an insert in accordance with another embodiment of the present invention.
FIG. 7 is a side elevation view of the insert of FIG. 6.

Referring to FIGS. 6 and 7, there is illustrated an insert 200 in accordance with an alternative embodiment of the present invention. The insert 200 includes a body 201 having a pair of parallel elongate plates or frame members 202, similar to plates 50, and a pair of frame members 204, similar to members 52, sandwiched between and welded, as illustrated at 206, or otherwise suitably fixedly attached to plates 202 at the end portions thereof to define an opening, illustrated at 208, similar to opening 54, in which is rotatably mounted, by means of a suitable high temperature bearing 209, a roller 210, similar to roller 42, on pin 212, similar to pin 58, which extends across the opening 208 and is suitably rigidly connected to the plates 202. When installed in a transfer grid, the insert body 201 comprising the plates 202 and sandwiched members 204 has generally an upper surface 214 and a lower surface 216. The sandwiched members 204 are shown to extend beyond the ends of and above and below the upper and lower surfaces of plates 202 and have lower outer corners, illustrated at 217, which are chamfered at a suitable angle of perhaps about 45 degrees.

The cross pin 212 is suitably rigidly attached to the plates 202 by suitable means such as, for example, at least one spring pin 218 in a respective aperture 220 formed partly in the respective plate 202 and partly in cross pin 212 to prevent the cross pin 212 from rotating or sliding axially. The spring pin 218 is a cylindrical oversize dowell formed of spring steel to stay tight within the aperture 220. Alternatively, a heavier duty roll pin may be provided. In order to prevent the plates 202 from collapsing inwardly to "pinch" the roller 210, a pair of such spring pins 218 or other suitable fasteners are provided to rigidly attach each of the plates 202 to the roller 210. In order to prevent interference by the spring pins 218 with a leveling instrument placed on the plates 202 during installation, the spring pins 218 are inserted so as not to protrude above the upper surfaces of plates 202.

In order that the insert 200 may be quickly and easily removed and replaced as necessary, each of the sandwiched members 204 is provided with means for clamping to the transfer grid including rotatable member 222, cylindrical member 224, upper member 226, stop pin 228, head member 230 for manipulation thereof, bracket 232 for engaging the lower surface of a lower transfer grid flange, and a setscrew 234 acting as an adjusting screw for engaging the upper surface of the flange, all similar to the corresponding members 80, 84, 86, 92, 81, 88, and 102 of the embodiments of FIGS. 3 and 4.

In each of the end portions of the insert 200 are provided a pair of apertures, illustrated at 235, generally parallel to the upper surface 214 and all the way through the plates 202 and the respective sandwiched member 204, for receiving a plunger pin 236. At each end portion of the insert 200, the pair of plunger pins 236 are oriented to protrude from opposite plates 202 and have end portions 238 which are tapered to blunt ends for engaging the respectively adjacent first members 14 of the transfer grid 10 for laterally stabilizing the insert 200.

Vertical threaded apertures 240 in the sandwiched members 204 extend from the upper surfaces thereof downwardly to and open into plunger pin apertures 235 respectively. Plunger screws 242 in the form of setscrews are threadedly received in the vertical apertures 240 for engaging the plunger pins 236 for adjusting insert lateral stability. The plunger screws 242 have cone points on their lower ends which may taper at an angle of perhaps about 45 degrees to engage similar points on the inner ends of the plunger pins 236, at generally the same angle, to force the plunger pins 236 outwardly a suitable distance, as illustrated by similar plunger screws 342 and plunger pins 336 in the embodiment of FIGS. 8 and 9 to be discussed hereinafter. The plunger screws 242 are provided with lock nuts 244. Thus, means are provided for lateral adjustment as well as clamping from above the upper surface of the insert so that these functions may be performed more easily and quicker without the lateral adjustment and clamping means extending so far above the insert upper surface as to interfere with the metal plates 20 being transferred across the grid 10, as shown in FIG. 7.

For purposes of illustration and not for purposes of limitation, for example, for a grate opening centerline space (distance between centerlines of cross-members 18) of 12.13 inches and a grate opening (distance between cross-members 18) of 10.63 inches, the insert length may be perhaps about 10.25 inches, the width (exclusive of the plunger pins) may be perhaps about 2.00 inches, the height of the sandwiched members may be perhaps about 3.00 inches, the length of each of the sandwiched members may perhaps be about 3.125 inches leaving an opening length for the roller of about 4.00 inches, the roller having a diameter of perhaps about 3.75 inches.

Figure 8:
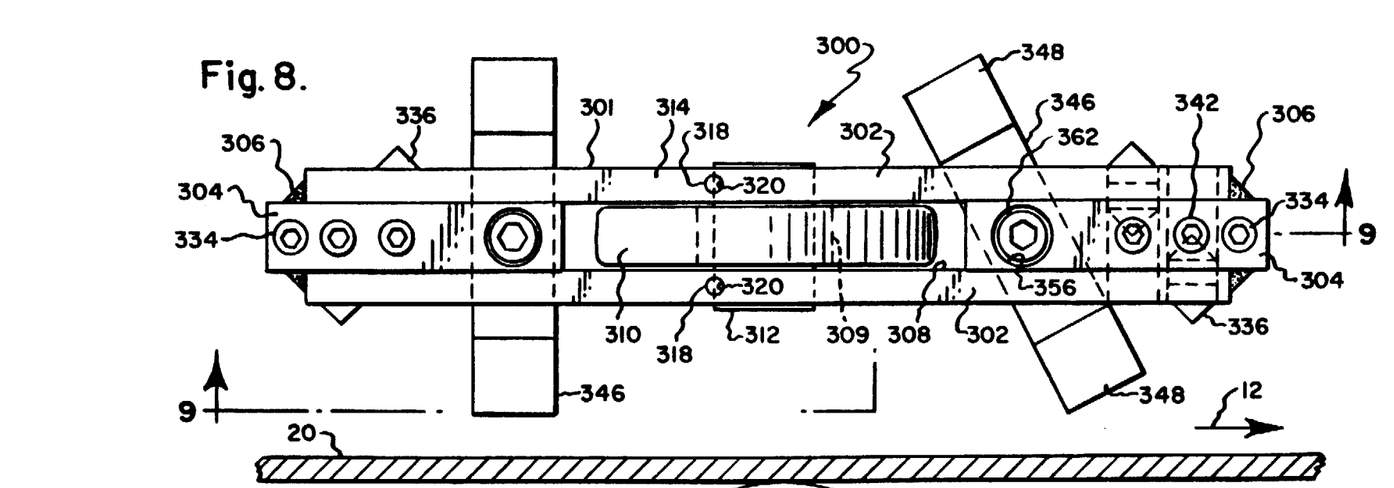
FIG. 8 is a view similar to that of FIG. 3 of an insert in accordance with yet another embodiment of the present invention.
Figure 9:
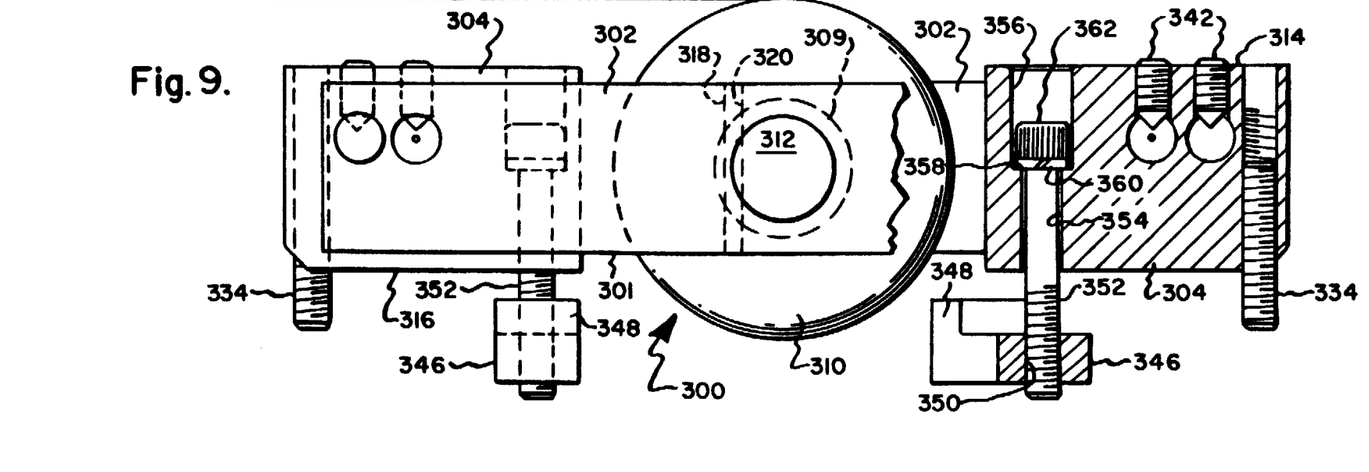
FIG. 9 is a view similar to that of FIG. 4 of the insert of FIG. 8.

Referring to FIGS. 8 and 9, there is shown at 300 an insert in accordance with yet another embodiment of the present invention. Insert 300, which may have an overall length of perhaps about 14.88 inches, includes a body 301 having a pair of parallel plates 302, a pair of sandwiched members 304 welded to the parallel plates 302 as at welds 306 and defining an opening 308 in which roller 310 is received and mounted to the plates 302 by means of pin 312 and high temperature bearing 309 and having spring pins 318, all similar respectively to the plates 202, sandwiched members 204, welds 206, opening 208, roller 210, pin 212, bearing 209, and spring pins 218 of the insert 200 of FIGS. 7 and 8. The upper and lower surfaces of insert 300 are illustrated at 314 and 316 respectively. The insert 300 also includes plunger pins 336 and plunger screws 342 similar to the pins 236 and screws 242 of insert 200, except that the screws 342 are shown to not protrude significantly above the upper surface of the respective sandwiched member 304. The insert 300 is also provided with an adjusting screw 334, similar to adjusting screw 234, which engages the upper surface of the lower flange 30 on the respective cross-member 18.

An elongate clamping foot 346 is suspended below each end portion of the insert 300 for cooperation with the adjusting screw 334 for clamping the insert 300 to the transfer grid 10. The foot 346 has a flanged portion 348 extending upwardly at each end of the foot for engaging the undersurfaces of first members 14 on opposite sides respectively of the insert 300.

The clamping foot 346, which has a length so that it can underlie both of a pair of adjacent first members 14, has a centrally disposed threaded aperture 350 which threadedly receives the lower end portion of a clamp screw 352. Clamp screw 352 is received in a vertical aperture 354 in the respective sandwiched member 304. The clamp screw 352 includes a cap portion 362 of increased diameter which is received within a counterbore 356 of the aperture 354 with the cap portion 362 resting on the shoulder 358 of the counterbore 356 whereby the clamp screw 352 remains stationary but rotatable by means of a suitable tool inserted in counterbore 356 for engagement therewith. A lock washer 360 is provided for maintaining the clamp screw 352 tight when the insert is clamped to the grate. When there is no resistance to rotation of the clamping foot 346 about the axis of clamp screw 352, rotation of the clamp screw 352 will effect rotation thereof. Resistance to movement of the clamping foot 346 will effect screwing movement of the clamp screw 352 relative to the clamping foot 346 so that, with the clamp screw 352 being stationary, the clamping foot 346 moves vertically upwardly or downwardly. Thus, for installation of the insert 300, the clamping foot 346 can be unscrewed (moved downwardly) until it clears the first members 14 and then rotated so that it underlies the first members 14.

The overall dimensions of insert 300 may be similar to those for insert 200. For example, the insert 300 may have an overall length of perhaps about 14.88 inches, an overall width, exclusive of the plunger pins, of perhaps about 2.00 inches, a sandwiched member height of perhaps about 3.00 inches, and a height of plates 302 of perhaps about 2.50 inches. The sandwiched members may each have a length of perhaps about 4.375 inches, and the roller may have a diameter of perhaps about 5.00 inches and a width of perhaps about 0.875 inch. The clamping foot 346 may have a length of perhaps about 5.25 inches, a width of perhaps about 1.25 inch, and a height of perhaps about 0.75 inch, the height at the flanged end being perhaps about 1.25 inch. The clearance between the roller 310 and the plates 302 may perhaps be about 0.03 inch. The spring pins 318 may each perhaps have a diameter of about ¼ inch and a length of about 2.5 inches. Lock washer 360 may perhaps be a ⅜ inch diameter high carbon lock washer. Plunger screws 342 may perhaps be ⅜ inch by 1.00 inch socket setscrews with cone points. Clamp screws 352 may perhaps be ⅜ inch by 3.5 inch long socket head cap screws with a minimum of 2 inches of thread. Adjusting screws 334 may perhaps be ¼ inch by 2 inches socket setscrews. The above dimensions are for illustrative purposes only and not for purposes of limitation. All screws and plunger pins are preferably coated with a suitable lubricant and corrosion inhibitor such as, for example, Never Seez (silver) material at assembly.

In order to install an insert 300, the location should be determined and a suitable height set. A hammer and chisel or an impact chisel is then used to clean rough scale from the pocket in the grate where the insert is to be installed. Loose scale should be brushed out and the pocket cleaned sufficiently to allow the insert to be centered. The lifting (adjusting) screws 334 should be installed into the adjusting screw threads. The insert is then placed into the grate opening, but without tightening at this time. A level gauge is then placed on the top surface of the insert between the weld area and the spring pins. The insert should then be adjusted with the vertical adjusting screws 334 and plunger screws 342 so that it is level and the roller 310 is about 0.06 inch below the set height, all plunger pins 336 being in very light contact with the grate. The clamp screw 352 should then be backed off until the clamping foot 346 is free, then the clamping foot 346 should be rotated with the clamp screw 352 and by hand until the clamping foot is perpendicular to the grate opening, i.e., under the first transfer grid members. The vertical adjusting screws 334 and the clamp screws 352 are then adjusted in unison to the desired set height, setting the insert with the vertical adjusting screws 334 to about 0.010 inch above the desired set height and pulling the insert down with the clamp screws 352 to the final setting. The plunger screws 342 are then tightened to perhaps about 18 to 20 foot-pounds, and the clamp screws 352 are tightened to perhaps about 30 to 35 foot-pounds.

It should be understood that the insert bodies 201 and 301 as well as the bodies of inserts 40 and 110 may be forged or cast as a single piece or otherwise suitably constructed, and such other constructions are meant to come within the scope of the present invention as defined by the appended claims.

Inserts according to the present invention are thus provided to allow easy and quick removal and replacement by adjustment of clamping means below the lower insert surface conveniently from above the insert but such as not to interfere with the movement thereover of metal plates for cooling thereof. In the embodiments of FIGS. 6 to 9, the lateral stability pins are also conveniently adjustable from above the insert again without interference with movement of the hot metal plates.

The easy and quick replacement or retrofitting of worn inserts allows cost effective cooling of hot metal plates formed in a plate mill as they are slid across a cooling bed plate transfer grid over the rollers for reduced marring. The hot metal plates 20 are transferred from a plate mill onto the transfer grid 10 after which they are slid by chains or the like or otherwise moved, as illustrated at 12, along the transfer grid with the rollers engaging the metal plates 20 to avoid frictional contact between the metal plates and the first and second members of the transfer grid.

It should be understood that while the invention has been described in detail herein, the invention can be embodied otherwise without departing from the principles thereof, and such other embodiments are meant to come within the scope of the present invention as defined by the appended claims.

What is claimed is:

1. A method for cooling hot metal plates formed in a plate mill comprising the steps of:
   a. providing a cooling bed plate transfer grid having a plurality of elongate parallel first members and a plurality of elongate second members extending crosswise to the first members for support thereof and defining therewith pockets;
   b. clamping to the transfer grid a plurality of inserts each having a body and a roller so that the inserts are supported in a plurality of pockets respectively with the rollers projecting above the insert bodies and the first and second members for rotatably engaging the metal plates as they are moved along the transfer grid;
   c. positioning the metal plates on the transfer grid; and d. moving the plates along the transfer grid with the rollers engaging the plates to avoid frictional contact between the plates and the first and second members.

2. A method according to claim 1 further comprising projecting the rollers above upper surfaces of the transfer grid a distance which is equal to between about 0.12 and 0.62 inches.

3. A method according to claim 1 further comprising unclamping ones of the inserts and clamping replacement ones of the inserts to the transfer grid as necessary for maintenance thereof.

4. A method according to claim 1 further comprising laterally stabilizing the inserts in the pockets.

5. A method according to claim 1 further comprising selecting the transfer grid so that the second members have lower flanges, the step of clamping the inserts to the transfer grid comprising clamping the inserts to the lower flanges respectively.

6. A method according to claim 1 further comprising causing end portions of the inserts to overlie the second members respectively, and the step of clamping the inserts to the transfer grid comprising clamping the inserts at the end portions to the second members respectively.

7. A method according to claim 1 further comprising causing end portions of the inserts to overlie the second members respectively, and the step of clamping the inserts to the transfer grid comprising effecting engagement of undersurfaces of the respectively adjacent first members by clamping members respectively.

8. An insert for a cooling bed plate transfer grid having a plurality of elongate parallel first members and a plurality of elongate second members extending crosswise to the first members for support thereof and defining therewith a plurality of pockets, the insert comprising an elongate body having a pair of end portions for overlying the second members respectively, roller means projecting above said body, means for clamping said body to the transfer grid so that said roller means projects above the transfer grid, said clamping means comprising at least one clamping member and means for effecting positioning of the clamping member below at least one of the first and second members in clamping engagement therewith.

9. An insert according to claim 8 wherein said clamping member is pivotally attached to said body and has a length to extend across the width of and beyond said body to clampingly engage a respective pair of the first members.

10. An insert according to claim 8 comprising two of said clamping member one of which is disposed between one of said end portions and said roller means and the other of which is disposed between an other of said end portions and said roller means.

11. An insert according to claim 8 further comprising an adjusting screw extendible downwardly from each of said end portions for engaging the respective second member for adjusting the height of said body.

12. An insert according to claim 8 further comprising means including at least a pair of pins extendible laterally from said body for engaging first members respectively on opposite sides of the insert for adjusting laterally the position of said body, vertical aperture means in the upper surface of said body, and screw means threadedly received in said aperture means and in engagement with said pins for adjusting the extent to which said pins extend from said body.

13. An insert according to claim 8 further comprising means for manipulating said clamping means from within an aperture means in the upper surface of the insert.

14. An insert according to claim 8 further comprising a pair of parallel frame members, said roller means comprising a cross pin, a roller rotatably mounted on said cross pin between said frame members, and means for rigidly attaching said cross pin to both of said frame members.

15. A plate transfer grid for a cooling bed comprising a plurality of elongate parallel first members, a plurality of elongate second members extending crosswise to said first members and defining therewith pockets, a plurality of inserts removably and replaceably mounted in a plurality of said pockets respectively, each said insert comprising an elongate body having a pair of end portions for overlying the second members respectively, roller means projecting above said body, means for clamping said body to the transfer grid so that said roller means projects above the transfer grid, said clamping means comprising at least one clamping member and means for effecting positioning of the clamping member below at least one of the first and second members in clamping engagement therewith.

16. A plate transfer grid according to claim 15 wherein said clamping member is pivotally attached to said body and has a length to extend across the width of and beyond said body to clampingly engage a respective pair of the first members.

17. An insert for a cooling bed plate transfer grid having a plurality of elongate parallel first members and a plurality of elongate second members extending crosswise to the first members for support thereof and defining therewith a plurality of pockets, the insert comprising a body having an upper surface, roller means projecting above said upper surface, means for clamping said body to the transfer grid so that said roller means projects above the transfer grid, said clamping means extending below said body and including means for manipulating said clamping means from within aperture means in said upper surface whereby to manipulate the clamping means from above the insert.

18. An insert according to claim 17 further comprising means including at least a pair of pins extendible laterally from said body for engaging first members respectively on opposite sides of the insert for adjusting laterally the position of said body, vertical aperture means in the upper surface of said body, and screw means threadedly received in said aperture means and in engagement with said pins for adjusting the extent to which said pins extend from said body.

19. A plate transfer grid for a cooling bed comprising a plurality of elongate parallel first members, a plurality of elongate second members extending crosswise to said first members and defining therewith pockets, a plurality of inserts removably and replaceably mounted in a plurality of said pockets respectively, each said insert comprising a body having an upper surface, roller means projecting above said upper surface, means for clamping said body to the transfer grid so that said roller means projects above the transfer grid, said clamping means extending below said body and including means for manipulating said clamping means from within aperture means in said upper surface whereby to manipulate the clamping means from above the insert.

20. A plate transfer grid according to claim 19 further comprising means including at least a pair of pins extendible laterally from said body for engaging first members respectively on opposite sides of the insert for adjusting laterally the position of said body, vertical aperture means in the upper surface of said body, and screw means threadedly received in said aperture means and in engagement with said pins for adjusting the extent to which said pins extend from said body.

* * * * *